US008985792B2

(12) United States Patent
Gallien et al.

(10) Patent No.: US 8,985,792 B2
(45) Date of Patent: Mar. 24, 2015

(54) BACKLIT INDICATOR KNOB AND RELATED METHODS

(76) Inventors: Robert Gallien, Los Gatos, CA (US); Natalio Valdez, Lodi, CA (US)

( * ) Notice: Subject to any disclaimer, the term of this patent is extended or adjusted under 35 U.S.C. 154(b) by 331 days.

(21) Appl. No.: 13/292,073

(22) Filed: Nov. 8, 2011

(65) Prior Publication Data

US 2013/0114270 A1 May 9, 2013

(51) Int. Cl.
*G01D 11/28* (2006.01)
*G05G 1/10* (2006.01)

(52) U.S. Cl.
CPC ...................................... *G05G 1/105* (2013.01)
USPC .................. 362/23.22; 362/23.09; 362/23.13; 362/23.16; 362/23.2

(58) Field of Classification Search
USPC ............................................ 362/23.01–23.22
See application file for complete search history.

(56) References Cited

U.S. PATENT DOCUMENTS 4,155,972 A * 5/1979 Hauser et al. ................. 264/250
6,334,688 B1 * 1/2002 Niwa .............................. 362/26
7,203,998 B2 * 4/2007 Howie, Jr. ....................... 16/441

* cited by examiner

*Primary Examiner* — Jason Moon Han
(74) *Attorney, Agent, or Firm* — John K. Buche; Buche & Associates, P.C.

(57) ABSTRACT

Disclosed is an improved backlit indicator knob.

6 Claims, 2 Drawing Sheets

BACKLIT INDICATOR KNOB AND RELATED METHODS

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

1. Field of Invention

This application is in the field of indicator knobs for electronic musical instrument amplifiers and related methods, including methods of construction.

2. Background

An amplifier (or amp) is an electronic amplifier which makes the signal of an electric musical instrument louder so that it will produce sound through a loudspeaker. Most amps may also be used to manipulate an instrument's tone by emphasizing or de-emphasizing certain frequencies within the electronic signal and/or supplementing the signal with electronic effects. Due to the multi-functionality of amps, most amps feature separate controls for each function. For example, many amplifiers feature a gain control, contour control, treble control, and the like. Many of an amp's functionality controls are driven via the turning of a knob, wherein manipulating the position of the knob modifies the sound quality produced by the associated musical instrument. Therefore, there is a need for an amplifier knob that provides an indication of whether or not it is presently influencing sound quality.

One attempt at meeting the above identified need is U.S. Pat. No. 7,036,188 (issued May 2, 2006) which discloses a "composite knob with light pipe leakage barrier." In this patent, the knob features a back-lit light window across the front and side of the knob (element 33, FIG. 1; col. 2:10-11), which window emits light whenever the knob is presently influencing sound quality. Still referring to this patent, backlight is delivered to the window (element 33, FIG. 1) via a transparent light pipe (element 75, FIG. 7) within an opaque skirt (element 85, FIG. 7) (light enters the light pipe at its back edge and escapes out the edge(s) adjacent to the light window). Although the indicator knob disclosed in this patent is capable of indicating influenced sound quality in an amplifier, the disclosed knob is nevertheless not entirely suitable for that purpose. For instance, the disclosed knob is not suitable for indicating sound since the back edge of the light pipe (element 75, FIG. 7) must receive light in order for the light to present at the window (element 33, FIG. 1) whereby either of these unfavorable circumstances result: (A) an expensive light source must be fixedly positioned immediately behind the light-pipe so that said light source turns with the knob; (B) a plurality of expensive light sources must be positioned around the turning circumference of the knob; or (C) the intensity of light emission at the window must necessarily be weak due to poor angles of light entry into the light-pipe. See also U.S. Pat. No. 6,499,191 (Issued Dec. 31, 2002) (which discloses a backlit knob with light-pipe (element 55, FIG. 5)). Also, construction of such a knob requires many components, is complicated, and is relatively expensive. Thus, there remains a need for an amplifier knob that provides an indication of whether or not it is presently influencing sound quality without the unsatisfactory aspects of the knob of U.S. Pat. No. 7,036,188.

Other attempts at a solution to the above identified need are similarly or relatedly unsatisfactory. For example: the "control knob using LED for backlighting" of U.S. Pat. No. 6,003,206 (issued Dec. 21, 1999) is unsatisfactory since an expensive light source requiring electricity must be fixedly positioned within the knob behind the light window so that said light source turns with the knob (e.g., the knob is unsatisfactory since it requires a complex power system and assembly for the internal light). For another example, the "control knob with multi-color indicator" of U.S. Pat. No. 7,205,495 (Apr. 17, 2007) is unsatisfactory since: (A) it features a shell with a window positioned around a potentiometer with a translucent shaft and internal LED; and (B) such a potentiometer must be specifically customized to the knob, which is expensive. Thus, there remains a need for an amplifier knob that provides an indication of whether or not it is presently influencing sound quality without the unsatisfactory aspects of the previous attempts.

SUMMARY OF THE INVENTION

In view of the foregoing, it is an object of this application to disclose an amplifier knob that provides an indication of whether or not it is presently influencing sound quality. It is a further object of this application to meet the above objective without: (A) an expensive light that is fixed to the knob; (B) a plurality of expensive light sources that are positioned around the turning circumference of the knob; (C) disclosing a knob wherein the intensity of light emission may be affected the positioning of the backlight source relative to the knob; (D) disclosing a knob that is difficult or expensive to construct; or (e) requires a customized potentiometer.

As a preferable means for meeting the above-recited objectives, this application discloses, among other things, a typically knob comprising three parts that are formed at the same time in a triple mould process, wherein no further assembly is required. The first part may be an outer shell with a light slit. The second part may be an intermediate shell with a slit, wherein the shell does not substantially absorb light (e.g., does not absorb light due to its color (for example: the color white)). In the most preferable embodiment, the second part lines the inner surfaces of the first part. Finally, the third part may be a light conducting (e.g., translucent) inner core that (1) aligns the inner surfaces of the second part, (2) provides a light window to the slit of the first part, and (3) features a light receiving surface.

BRIEF DESCRIPTION OF THE FIGURES

The manner in which these objectives and other desirable characteristics can be obtained is better explained in the following description and attached figures in which.

Figure 1:
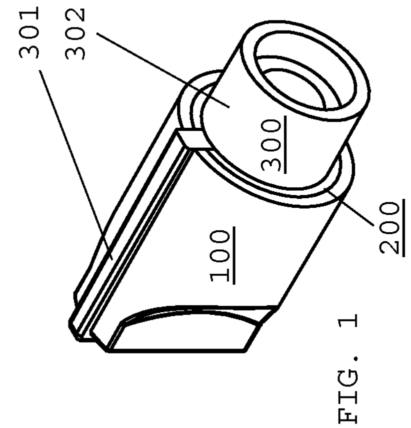
FIG. 1 is a perspective view a knob 1.

It is to be noted, however, that the appended figures illustrate only a typical embodiment disclosed in this application, and therefore, are not to be considered limiting of the scope of invention principles, for the invention principles disclosed herein may admit to other equally effective embodiments that will be appreciated by those reasonably skilled in the relevant arts. For instance, the components in the figures are not necessarily to scale, with an emphasis instead being placed upon illustrating the principles of the invention. In the figures, like reference numerals designate corresponding parts throughout the different views.

DETAILED DESCRIPTION OF PREFERRED EMBODIMENTS

Disclosed is a knob that receives light on a surface from a light source at any radial direction relative to the axis of the knob, wherein the received light can be emitted at another surface, and wherein the light source is external to the knob.

Suitably, the disclosed knob comprises few components that may be injection-molded together without further construction or assembly. The more specific aspects of the knob are best disclosed with reference to the figures.

Figure 2:
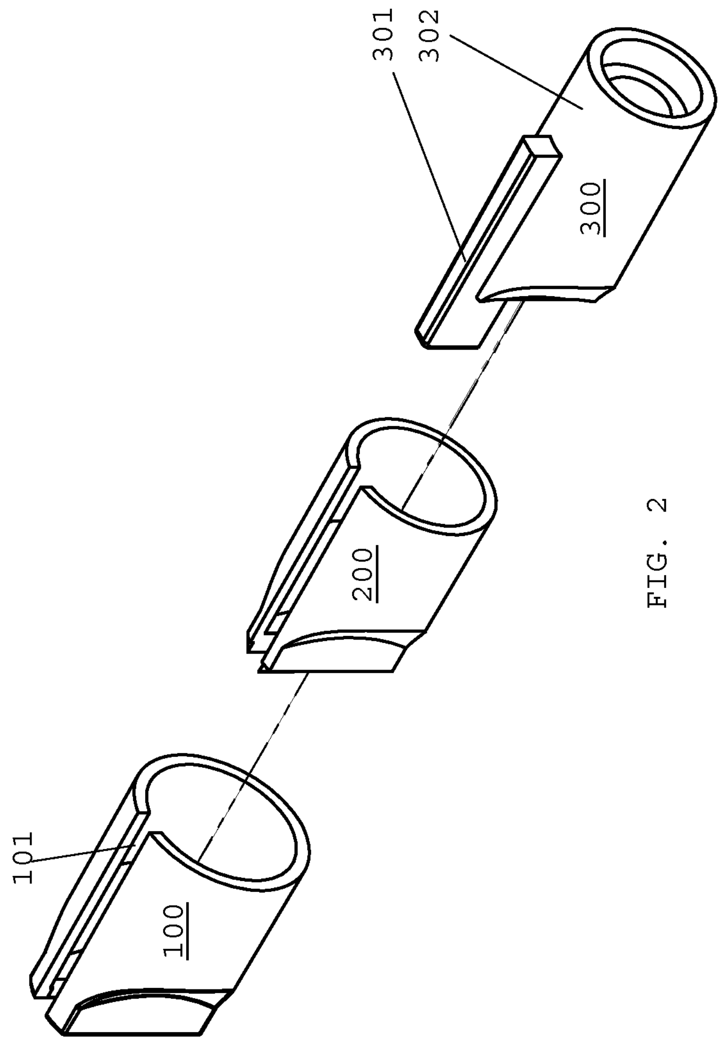
FIG. 2 is an exploded view of the knob 1.

FIG. 1 depicts a knob 1 comprising three parts: an outer shell 100; an intermediate shell 200 that aligns an inner surface of the outer shell 100; and a core 300 that (a) aligns an inner surfaces of the intermediate shell and (b) features a light emitting surface 301 and a light receiving surface 302. As seen in the figure, the knob 1 is depicted with a generally cylindrical structure, the outer surface of which being primarily defined by the outer shell 100, the light emitting surface 301, and light receiving surface 302 of the core 300. Still referring to the generally cylindrical structure of the knob 1, the outer shell 100 and intermediate 200 shell abruptly terminate so that the light receiving surface 302 of the knob 1 forms a coaxial cylindrical projection therefrom. The light receiving surface 302 is for insertion into a machine to be controlled, e.g., an amplifier. Preferably, the inside surface of the knob 1, although not depicted in the figures, is formed according to geometries which allow for turning controls (e.g., coaxial insertion of the control into the knob 1). FIG. 2 is an exploded view of the knob 1 and depicts the more specific features and details of the outer shell 100, intermediate shell 200, and core 300.

An embodiment of the outer shell 100 is depicted in FIG. 2. As seen in that figure, the outer shell 100 is depicted as hollow and a substantially cylindrical structure that is capped on one end and open at the other, wherein a radial slit 101 is established through a portion of the cap and along the side of the shell 100 between the open and capped ends. As depicted, the inner surfaces of the outer shell 100 generally conforms to the shape of the outer surfaces, but such a feature is not entirely necessary and in alternate embodiments the inner surface may be out of conformation with the outer surface. The outer surface may preferably be formed: (1) of any materials suitable for the outside surface of a knob, including plastics, metals, woods, and rubbers, that are known to those of skill in the art; and (2) by any manner suitable for working with such materials, including molding, cutting, and pressing. In a preferable embodiment the external surface is rubber and formed by injection molding.

The core 300 and intermediate shell 200 are best disclosed together and are both depicted in FIGS. 1 and 2. Referring first to FIG. 2, the outer surface of the core 300 may define a cylinder with a radial projection defining the light emitting surface 301 at one end (wherein the radial projection partially extends down the cylindrical length) and a light receiving surface 302 at the other end. The intermediate shell 200 may be a layer or coating that is non-absorbent of light (as discussed in greater detail below) and that coats the cylindrical portion of the core 300. The intermediate shell 200 may preferably be formed: (1) of any suitable non-light absorbing materials (e.g., white or lighter in color), including but not limited to plastics; and (2) by any manner suitable for working with such materials, including but not limited to molding, cutting, and pressing. In a preferable embodiment the intermediate surface 200 is white plastic and formed by dual molding (i.e., injection molding) along the inner surface of the outer shell 100. The core 300 may preferably be formed: (1) of any suitable light transmissive materials (e.g., transparent or translucent), including but not limited to plastics or glasses; and (2) by any manner suitable for working with such materials, including but not limited to molding, cutting, and pressing. In a preferable embodiment the core 300 is translucent plastic and formed by tri-molding with the outer and intermediate shells 300 and 200 (i.e., injection molding along the inner surface of the intermediate shell 200 so that the radial projection is formed in the slit of the outer shell 300 to present the light emitting surface 301 (as seen in FIG. 1).

Figure 3:
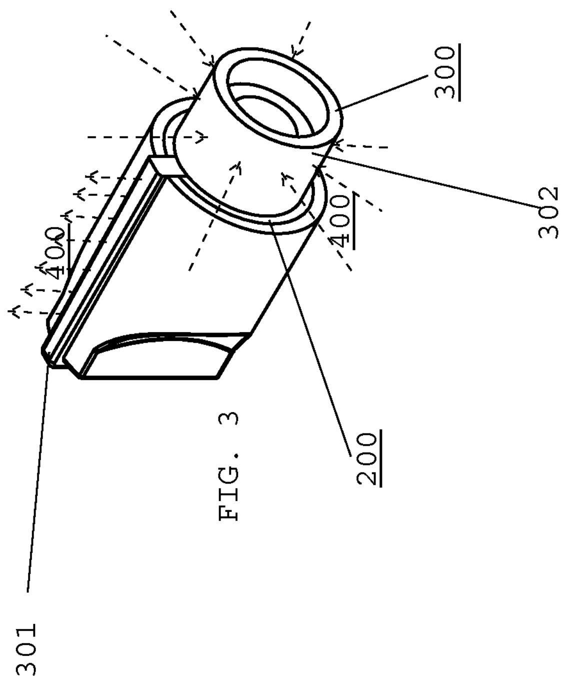
FIG. 3 is another perspective view of the knob 1.
Figure 4:
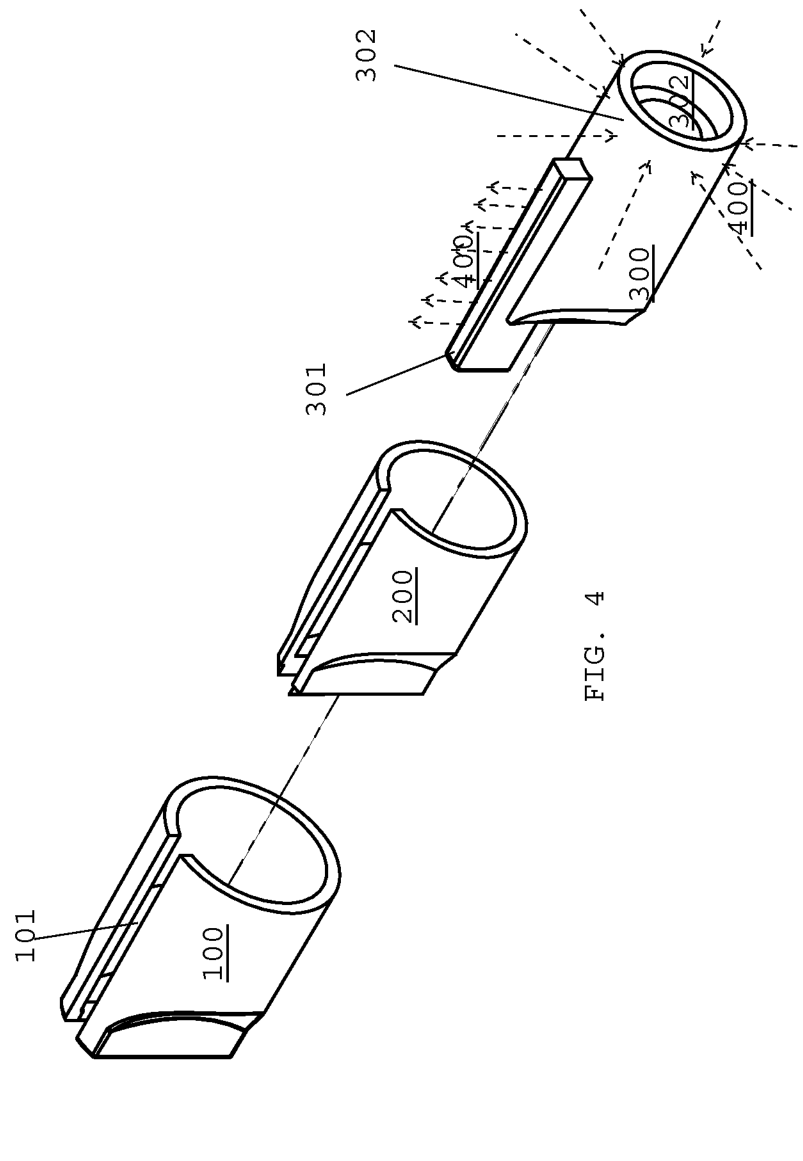
FIG. 4 is another exploded view of the knob 1.

The knob 1 disclosed by this specification preferably operates by receiving light at the light receiving surface 302 of the core 300 and concurrently emitting the light from the radial projection 301 of the core. FIGS. 3 and 4 illustrate this operation. FIGS. 3 shows that light 400, provided to the light receiving surface 302 of the core 300 from any direction, emits from the light emitting surface 301. Operably, light 400 enters the core 300 via the light receiving surface 302 and, due to the intermediate shell 200 that is non-light absorbent (e.g., white in color), the light 400 may be conducted through the core 300 for emission through the light emitting surface 301. That is to say, the intermediate shell 200 may serve to reduce light 400 absorption by the outer shell 300 so that unabsorbed light may emit from the light emitting surface 301.

As alluded to above, the light emitting surface 301 may preferably coaxially receive the controls of a machine. As seen in FIG. 3, such coaxial receipt of machine control allows a backlight source to be direct from any point within the machine to the light receiving surface 302 so that light emission results at the light emissive surface 301. In one non-limiting example, a single light source may be positioned at any point around the light receiving surface 302 of the knob. In another non-limiting example, multiple light sources of the same or different colored light may be positioned at different points around the light receiving surface 302 so that lighting effects (e.g., changes in color or intensity of light emitted from the light emitting surface 301) may be accomplished at the light emitting surface 301.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

These aspects, among other things, demonstrate the industrial applicability of this invention.

Moreover, it should be apparent that further numerous structural modifications and adaptations may be resorted to without departing from the scope and fair meaning of the present invention as set forth hereinabove and as described herein below by the claims.

We claim:

1. A method of manufacturing a knob comprising the steps of:

molding a hollow outer shell with a slit and an open end;

molding a non-light absorbing intermediate shell to the inner surface of the outer shell; and, molding a light-conducting core with (a) a projection at one end that has a light emitting surface and (b) a cylindrical light receiving surface around the other end into the inner surfaces of the intermediate shell so that the projection occupies the slit, wherein the light emitting surface is exposed at the slit and (ii) so that the cylindrical light receiving surface of the core extends out of the open end of the outer shell, whereby light directed to the light receiving outer surface is emitted at the light emitting surface along the slit of the outer shell.

2. A method of manufacturing a knob according the claim 1 wherein the intermediate shell is the color white.

3. A method of manufacturing a knob according to claim 1 wherein the core is formed by tri-molding with the outer and intermediate shells.

4. A method of illuminating a knob comprising the steps of:

Ensuring that the knob comprises:

a light conducting core with a cylindrical light receiving surface and a light emitting surface, a non-light absorbing intermediate shell that occupies an inner surface of an outer shell, and the outer shell with a slit and an open end, the outer shell positioned around the core so that the light emitting surface is exposed at the slit and so that the light receiving surface is presented at the open end of the outer shell;

Illuminating the cylindrical light receiving surface so that light is emitted from the light emitting surface along the slit.

5. A method of illuminating a knob according to claim 4 wherein the light emitting surface partially extends down the cylindrical length.

6. A method of illuminating a knob according to claim 4 wherein the light illuminates the light receiving surface from a direction that is perpendicular or oblique to the axis of the cylindrical core.

* * * * *